United States Patent [19]

Tømmeraas et al.

[11] 4,219,938

[45] Sep. 2, 1980

[54] METHOD AND MEANS FOR GAUGING OF THREADS

[75] Inventors: Nils C. Tømmeraas; Kolbjørn Legernes, both of Raufoss, Norway

[73] Assignee: A/S Raufoss Ammunisjonsfabrikker, Raufoss, Norway

[21] Appl. No.: 922,323

[22] Filed: Jul. 6, 1978

[30] Foreign Application Priority Data

Jul. 11, 1977 [NO] Norway ............................. 772445

[51] Int. Cl.² .................................................. G01B 5/16
[52] U.S. Cl. ..................................... 33/199 R; 33/174 E
[58] Field of Search ............ 33/199 R, 147 M, 179.5, 33/174 R, 174 P, 199 B, 147 H, DIG. 2, 174 E

[56] References Cited

U.S. PATENT DOCUMENTS

| 2,308,011 | 1/1943 | Johnson | 33/199 R |
| 2,842,862 | 7/1958 | Johnson | 33/199 R |

FOREIGN PATENT DOCUMENTS 448756 5/1948 Canada .................................. 33/199 R

*Primary Examiner*—Willis Little
*Attorney, Agent, or Firm*—Watson, Cole, Grindle & Watson

[57] ABSTRACT

A method and means for gauging of threads, by use of a gauge roller, for the purpose of detecting possible defects in the thread profile. The gauge roller, having different areas which have the correct profile of parts of the thread groove and depressions between said areas, is mounted on at least one lever for permitting approximately radial movement of the gauge roller. A reference for indicating and/or measuring said movement is established by mounting a reference element in the vicinity of the gauge roller, and movements of the gauge roller caused by defects in the thread are indicated and/or measured relatively to the reference. The reference may be established by use of a roller having the correct profile of the thread, whereby the relative radial and/or axial movement between the gauge roller and the reference roller is indicated and/or measured. Alternatively may be used a reference established by means of a sensor which follows the defect indicating movement of the roller gauge in at least one direction, whereby defects are indicated and/or measured as variations in the distance between the sensor and a surface of the thread.

3 Claims, 11 Drawing Figures

METHOD AND MEANS FOR GAUGING OF THREADS

The present invention relates to a method and means for gauging of threads.

Forming of external and internal threads may be done by use of a number of different methods, with or without chipping. By chipping methods both single edge and multi edge cutting tools may be used.

By some methods of forming threads, such as milling and rolling, tools are used which to a large extent define and secure the correct shape of the thread. By these methods the tool forms a part of the system of inspection or supervision of the finished thread. Presupposed that the milling or rolling tool has the correct shape and the correct dimensions, the inspection of the finished work piece may be limited to for instance visual defects, pitch diameter and taper.

By other methods of making threads, such as cutting by use of a single edge tool, the shape of the thread will also be defined by the geometry of the tool, but there will be a higher risk of defects on the cutting edge, which will have more serious consequences than defects on a single tooth on a multi teeth milling tool. Further, important dimensions of the thread will depend on the accuracy of guiding the single edge tool in the thread cutting machine relatively to the work piece. The same problem also arises, although to a less degree, by use of single multi edge tools in lathes.

The method and means in accordance with the present invention are in particular suited for inspection or supervision of threads while the work piece is still in the cutting machine, but is also adapted for use independently of the machine. A main object of the invention is to provide an inspection method and means for single edge thread cutting, which gives substantially the same protection against undetected defects as by methods using multi edge tools such as milling or rolling tools.

The present invention concerns the use of a gauge roller of the type described in U.S. Pat. No. 2,432,160. The gauge roller comprises circumferentially spaced areas, each of which having a cross section adapted to contact only a part of the thread surface when the gauge roller is rolled along the thread. The different areas having the correct profile of the thread groove will come into contact with different parts of the thread surface, and a movement of the gauge roller axis during the rolling will indicate a defect on the thread, as for instance incorrect flank angle, depressions or bumps in the flanks or other geometrical defects.

The previously known method, however, is not suited for inspection of tapered threads, i.e. threads formed on or in a tapered bolt or tube. Further, the known method requires the use of a special apparatus, and cannot be performed while the work piece is still in the thread cutting machine. Moreover, the known method does not permit measuring of the pitch diameter of the thread.

U.S. Pat. No. 2,566,356 concerns a thread inspection method which is similar to that described in the above patent, and is particularly adapted for measuring of the pitch diameter of external threads.

British Pat. No. 700,923 shows a gauging device for checking surfaces in for instance threads, and comprises in one embodiment a rotatable gauging member having a ridge of spiral form. This gauging member substantially acts in the same manner as the gauge roller described in U.S. Pat. No. 2,432,160.

From German Accessibility Print No. 2,200,432 is known a device for detection of the pitch of external threads. The thus known device is not adapted for inspection of the geometry of the thread form, except from the pitch.

The method according to the present invention comprises the establishing of a reference based on the thread area in the vicinity of the contact area between a gauge roller and the thread.

The establishing of the reference may be carried out by use of a reference element which has a profile corresponding to at least a part of the profile of a thread groove without defects. This element is mounted independently of the gauge roller and will now follow the radial movement of the gauge roller which occurs when the roller passes a defect area of the thread. Thus, radial movements of the gauge roller may be indicated by detecting the relative radial movement between the gauge roller and the reference element.

The establishing of the reference may also be carried out by use of a reference element which does not contact the thread, but which is adapted for measuring the distance between the axis of rotation of the gauge roller and an area of the thread in the vicinity of the contact area between the gauge roller and the thread. The means for measuring this distance may consist of a pneumatic head which detects the distance between the head and the thread by measuring the flow resistance of a fluid through a gap between the pneumatic head and the thread flank. Another means for measuring the distance consist of an inductive coil and a device for measuring the variations of the current in the coil by radial movement of the coil together with the gauge roller when the roller passes a defective area on the thread. Still another means for measuring the distance consists of an electrocapasitive sensor which will also produce a signal when the distance is varied.

When threads are formed by use of a numerically controlled lathe, the measure signal from the above means may be transferred to a computer in which is programmed a limit value of divergence from a nominal value, and the operator of the machine will be informed as to whether the work piece is acceptable. After cutting of a thread the gauge roller and the reference element are mounted, preferably close to each other, on the cutting machine.

The gauge roller may be mounted on one or more pivotable levers, and is pressed into engagement with the thread by means of one or more springs acting on the lever or levers. By rotation of the threaded work piece the gauge roller is rolled along the entire thread, and the reference element, of one of the types described above, will act as a reference for the indication of defects on the thread.

An important additional feature is that the gauge roller may be adapted to contact both of the thread flanks, and it may be mounted for free axial movement. Also the reference element in the form of a roller having the correct profile of the thread groove, when used, may be mounted for free axial movement.

This arrangement will establish the possibility of measuring relative axial movement between the gauge roller and the reference roller when rolled along the thread. Thus, a deviation of the axial distance between the two rollers indicates either a defective thread profile or an incorrect pitch, or both. However, a defective thread profile would also be indicated by a relative radial movement between the two rollers and measuring of relative movements in the two directions makes it possible to decide which type of error is indicated.

Instead of using a single gauge roller adapted for engaging both the thread flanks one or more gauge rollers may be used, each of which engaging only one flank. Preferably two such rollers are used, mounted for free radial movement. When arranged in fixed axial distance from each other, but being free to move axially as a unit, there is also established the possibility to gauge the pitch of the thread.

Alternatively a gauge roller may be used, having depressions on one side along a first part of the circumference, for instance half the circumference, and depressions on the other side along another part of the circumference, for instance the other half. This will result in a gauging of the thread alternately along the two flanks.

The use of the method and means according to the invention is not limited to the cutting machine. The method and means may be used in any apparatus which permits the threaded work piece to be rotated. The rotation does not need to be exact, because the indication of errors by means of the present invention is carried out without the axis of rotation of the work piece as a reference. This means that the invention is particularly suited for inspection of tapered threads, i.e. threads on a tapered work piece. The previously known methods and means do not enable gauging of such threads without an exact adjustment of the gauging means for movement along the thread profile, and even then the gauging will be influenced by a possible unstraight axis of the work piece, a possible inaccurate rotation of the work piece and a possible inaccurate thread diameter.

The general principle of the invention will be apparent from the following description of preferred embodiments of the means in accordance with the invention.

Figure 1:
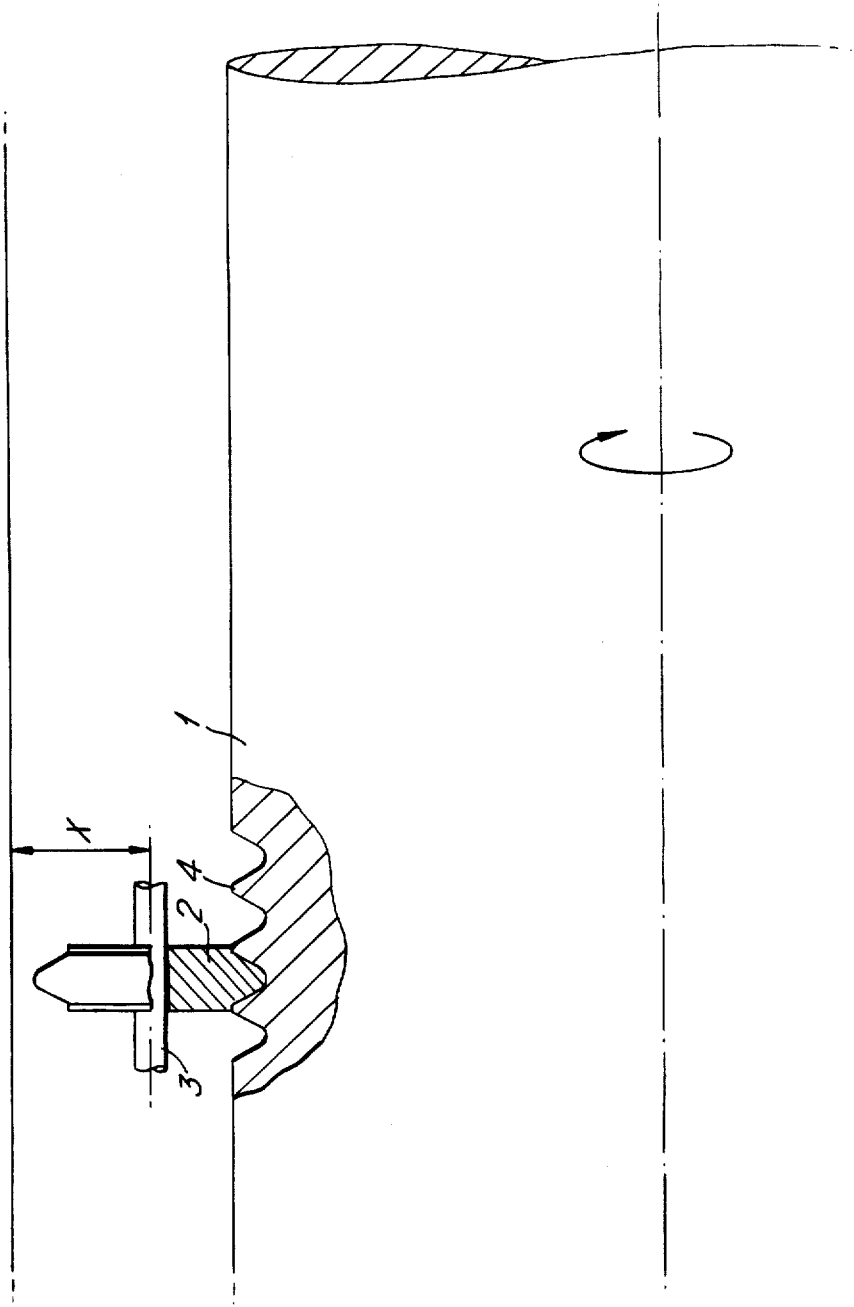
FIG. 1 shows a gauge roller mounted on a shaft for being rolled along a thread on a bolt.

As shown in FIG. 1 the gauge roller 2 is mounted for rotation on a shaft 3, for rolling along a thread 4 on a bolt 1. The shown profile of the roller is the same as the correct thread groove profile, and if the thread is without defects the roller will roll along the thread with a constant distance x between the roller axis and a fixed reference. The gauge roller is in the form of a wheel, and is mounted on the shaft for free axial movement. The shaft 3 may for instance be journalled on a pivotable lever, for approximately radial movement relatively to the bolt 1 in the case of a thread defect.

Figure 2:
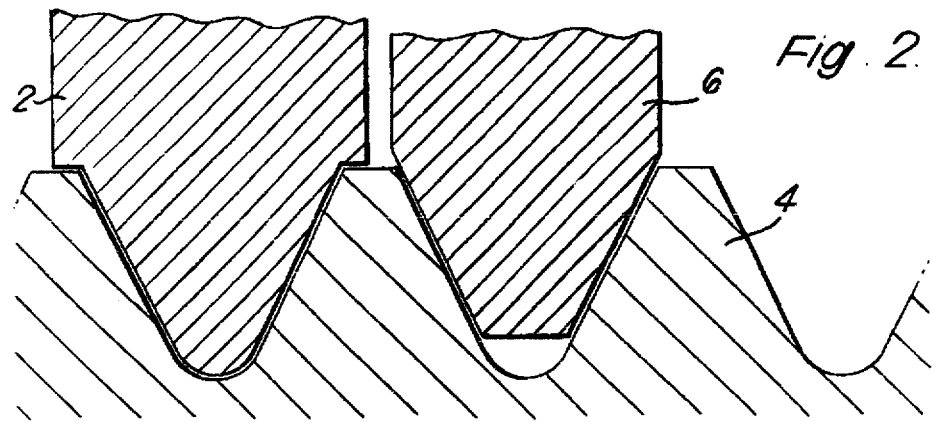
FIGS. 2-7 show in enlarged scale the contact area between the thread and the gauge roller, and between the thread and a reference element. The figures show the gauge roller in positions with different contact areas between the thread and the gauge roller.

In the position shown in FIG. 2 the gauge roller contacts the thread with a profile corresponding to the correct thread profile. A reference roller 6 contacts both the thread flanks, and is mounted independently of the gauge roller 2. Thus, the reference established is fixed relatively to the thread 4, and defects in the thread will be indicated by relative radial and/or axial movement between the gauge roller and the reference roller. The reference element, however, needs not be a roller, but may be a non rotating element in frictional contact with the thread. The use of a reference roller gives the advantage that the friction is reduced and that consequently the wear of the reference element is reduced. The reference element may be mounted on a spring biased pivotable shaft, in the same manner as the gauge roller.

Figure 3:
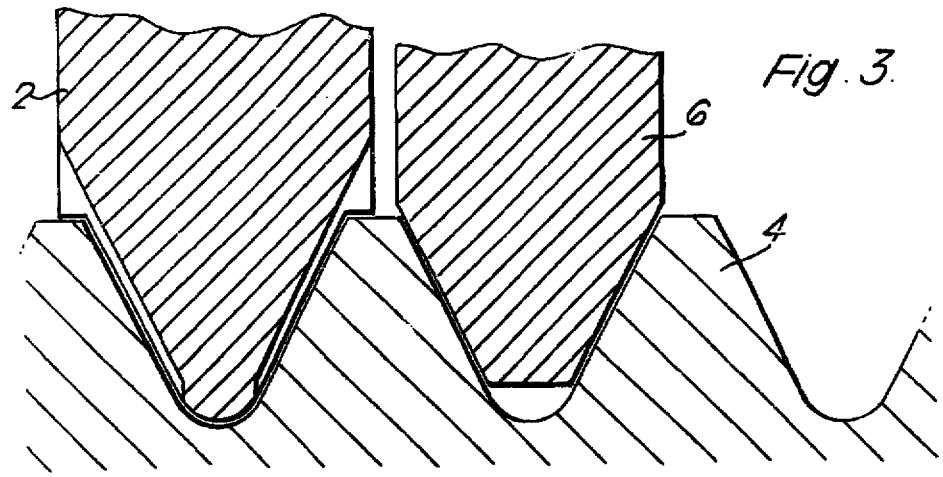

FIG. 3 shows the gauge roller 2 in a position where a part of the roller having flank depressions contacts the thread. Thus, the roller contacts only the bottom of the thread groove.

Figure 4:
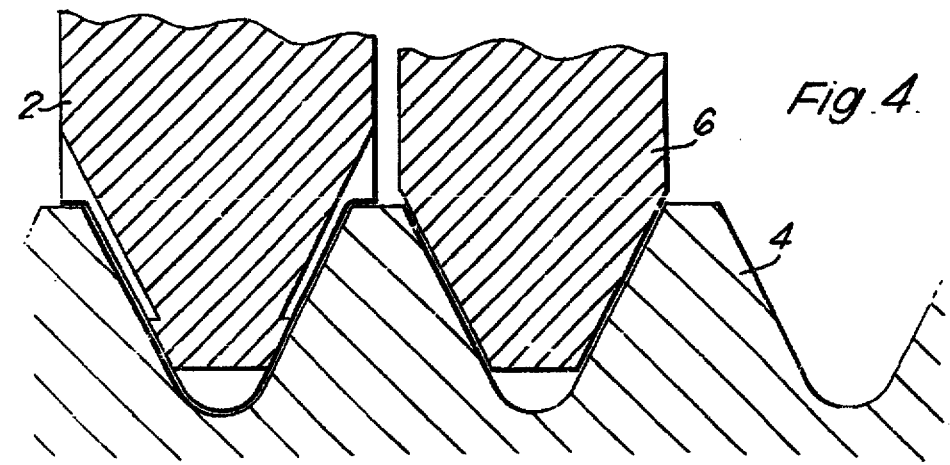

FIG. 4 shows the gauge roller in a position where a part of the roller having the top removed contacts the thread 4. Depressions are also formed in the roller along a substantial part of the flanks, and only small remaining areas having the correct thread profile contact the threaded flanks.

Figure 5:
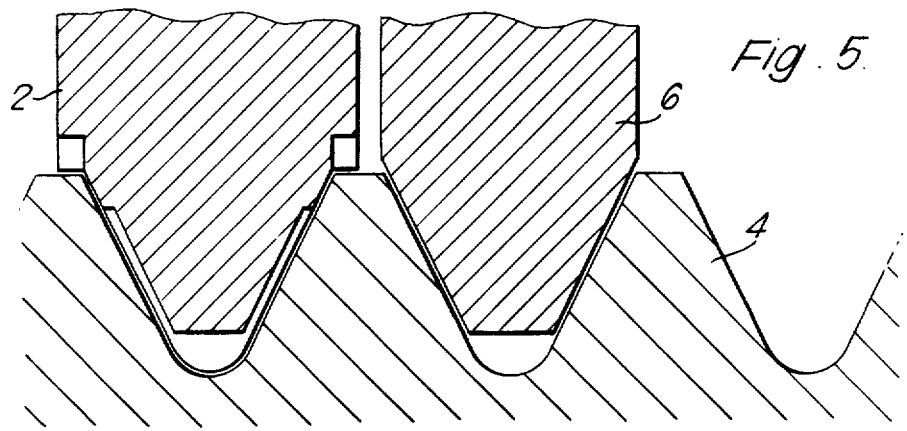

FIG. 5 shows the gauge roller in a position where it contacts the thread flanks only adjacent the thread tips.

Figure 6:
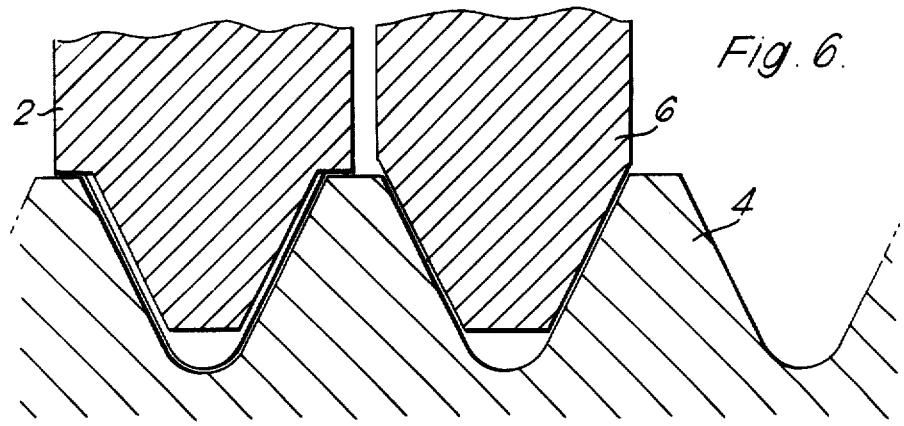

FIG. 6 shows the gauge roller in a position where the depression extends over the entire part of the roller protruding into the thread groove, with areas on the roller contacting only the crest of the thread.

Figure 7:
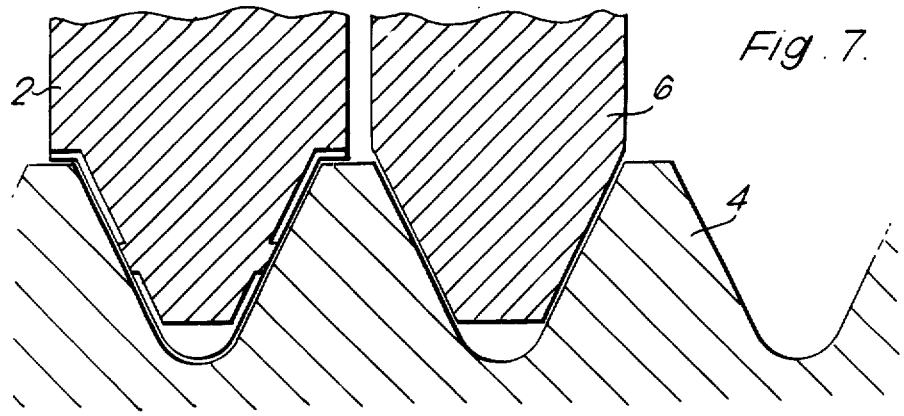

FIG. 7 shows the gauge roller in a position where depressions are formed both over the part of the roller protruding into the thread bottom and along most of the flanks. Only near the middle of the flanks are left areas having the correct thread profile.

Figure 8:
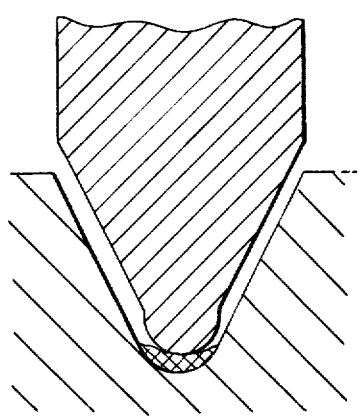
FIGS. 8-10 show how errors on the thread influence the gauge roller.

FIG. 8 shows a thread having a defect in the root of the thread, which defect for instance may have been caused by a broken edge on the cutting tool, so that material which should have been removed has been left in the root. During the rolling the section of the gauge roller having the full size top will be forced outwardly of the root, and the corresponding movement of the gauge roller will be indicated relatively to the reference element. If the defect consisted of a depression in the thread root, the gauge roller would have moved inwardly, i.e. oppositely of what is shown in FIG. 8.

Figure 9:
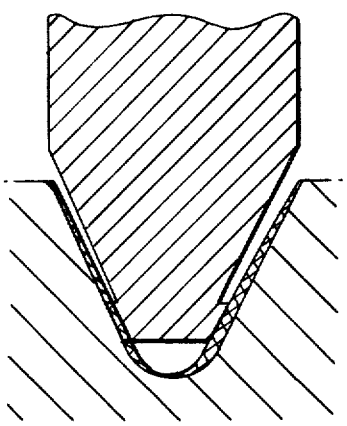

FIG. 9 shows a thread having an incorrect flank angle. This defect will be detected by the section of the gauge roller having full size flanks adjacent the crest. When this section rolls along the defective area, the gauge roller will be forced outwardly from the thread groove. The same defect may also be detected by the sections of the gauge roller shown in FIG. 4,5 or 7, but probably not by the section shown in FIG. 3.

Figure 10:
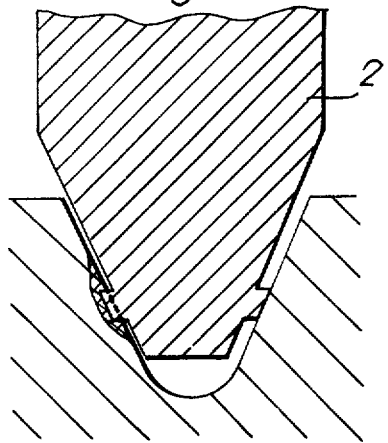

FIG. 10 shows a thread having a defect in the form of a depression in one of the flanks. This defect will be detected by the section of the gauge roller shown in FIG. 7. This section will be forced into the depression. The movement of the gauge roller will in this case be both radial and axial relatively to the bolt, presupposed that the roller is free to move in both these directions. Thus, the defect will be indicated by both a radial and an axial movement relatively to a reference element.

It will be understood that a reference element is used together with the gauge roller in all the examples described above. This reference element, for instance in the form of a reference roller as shown in FIGS. 2-7, is free to move radially to the bolt independently of the gauge roller. It may also be free to move axially.

Figure 11:
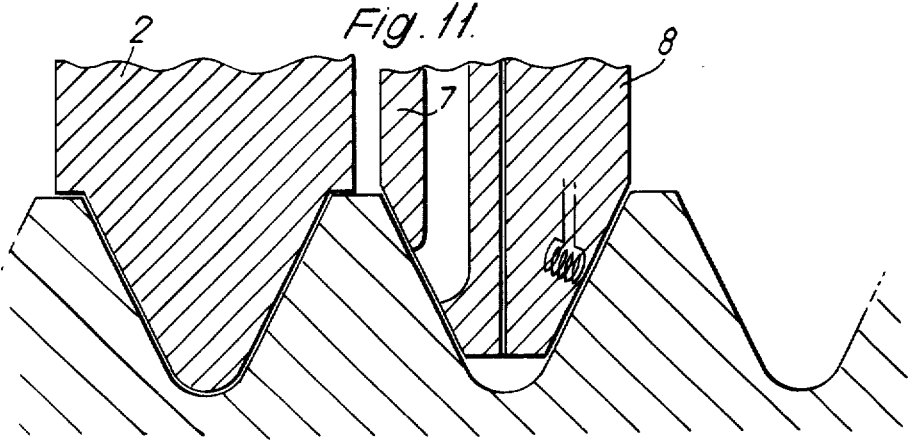
FIG. 11 shows different means for indicating the radial and/or axial movement of the gauge roller.

FIG. 11 shows alternative examples of means for indicating the axial and/or radial movement of the gauge roller when rolling in a defective thread groove. To the left is shown the gauge roller in a position where a section of the roller having the complete profile of the thread groove is contacting the groove.

In the adjacent thread groove is shown two different means for indication of movement. One means comprises a pneumatic head 7 having a surface slightly spaced from one thread flank, and another means comprises an inductive coil.

The pneumatic head 7 is mounted on the same shaft as the gauge roller. Air under pressure flowing through the head will escape through the space between the head and the thread flank, and movements of the gauge roller will cause variations in the width of this space, thus causing variations in the flow of air through the head. Thus, defects in the thread may be indicated by measuring the air flow.

Also the inductive coil is adapted to follow the movements of the gauge roller axis, and may be fixed to a head protruding into the thread groove. This head is spaced from the thread flank, but the width of this space will vary in accordance with the movements of the gauge roller when the roller passes defective areas in the groove. This will cause a variation of the current through the coil, which may be recorded as a signal.

Instead of an inductive coil may be used an electrocapacitive sensor.

It will be understood that the different means for indicating radial and/or axial movement of the gauge roller may be used one at a time, or combined.

It will also be understood that two or more gauge rollers may be used simultaneously on the same work piece.

The gauge roller and the reference element are shown axially displaced lengthwise of the work piece, but may also be arranged circumferentially displaced along the thread. However, the gauge roller and the reference element are preferably arranged close to each other. This will permit inspection of substantially the entire length of the thread.

The method and means according to the invention may also be used for inspection of internal threads.

The depressions formed in the gauge roller may be different from those shown in the illustrated examples, and instead of the sections having different depressions, the area on the gauge roller having the correct profile of the thread may be in the form of a helical ridge.

The gauge roller and the reference element may, together with pivotable levers on which they are mounted, be produced as a unit adapted to be taken readily into use for gauging a thread after the cutting. This unit may be adapted for being readily mounted on the cutting machine, or may be permanently mounted. The gauging will then be carried out without loosening the work piece from the machine.

A particular advantage is achieved when making tapered threads. If the gauging shows that the thread is defective, the defect may in many cases be corrected, because the work piece has not been moved from the initial chucking in the machine. If the work piece was loosened and placed in a gauging apparatus, it would not be possible to chuck the work piece in the cutting machine again for correcting a defect, because the initial chucking position would not be found.

We claim:

1. A method for determining defects in thread profiles, comprising the steps of:
   mounting a gauge roller in spaced relationship with a reference roller to enable radial movement of the gauge roller with respect to the reference roller;
   rolling the gauge roller and reference roller along a thread; and
   detecting the radial movement of the gauge roller with respect to the reference roller by the plurality of different areas of the gauge roller having correct profiles of parts of the thread groove with depressions between said profile parts.

2. The method as in claim 1 further comprising the step of mounting the reference roller for free radial and/or axial movement with respect to the thread profile, the reference roller having the correct profile of at least a substantial part of the thread groove; and
   the step of mounting means for indicating the relative movement between the gauge roller and the reference roller.

3. The method as in claim 1 further comprising the step of mounting the reference roller to follow at least the radial movement of the gauge roller to indicate radial movement thereof relative to an area of the thread surface.

* * * * *